United States Patent [19]
Shimizu

[11] Patent Number: 5,414,685
[45] Date of Patent: May 9, 1995

[54] DISK PLAYER WITH CONSTANT ANGULAR VELOCITY

[75] Inventor: Hidetoshi Shimizu, Ueda, Japan

[73] Assignee: Shinano Kenshi Kabushiki Kaisha, Nagano, Japan

[21] Appl. No.: 130,790

[22] Filed: Oct. 4, 1993

[30] Foreign Application Priority Data

Jul. 14, 1993 [JP] Japan .................................. 5-174222

[51] Int. Cl.$^6$ .............................................. G11B 7/00
[52] U.S. Cl. ....................................... 369/48; 369/124
[58] Field of Search ....................... 369/32, 47, 48, 54, 369/111, 124

[56] References Cited

U.S. PATENT DOCUMENTS 4,959,825  9/1990  Okano .................................... 369/48
5,253,243 10/1993  Suzuki ................................... 369/48

Primary Examiner—W. R. Young

[57] ABSTRACT

An object of the invention is to provide a disk player, which is capable of accessing to a disk in a short time, having higher durability and lower electric power consumption. The disk player comprising: a motor for rotating a disk; an optical pick-up for reading recorded data, which include synchronizing signals and output-data elements, and outputting as first signals; a first clock section for extracting the synchronizing signals and generating first clock signals, whose frequency is equal to that of the synchronizing signals; a second clock section for generating second clock signals and coinciding the frequency and the phase of the second clock signals with that of the first clock signals; a data extracting section for extracting the output-data elements on the basis of the second clock signals and outputting as second signals; and a processing section for rotating the motor at fixed rotational speed.

8 Claims, 2 Drawing Sheets

DISK PLAYER WITH CONSTANT ANGULAR VELOCITY

BACKGROUND OF THE INVENTION

1. Field of the Invention

The present invention relates to a disk player, more precisely relates to a disk player having a motor for rotating a disk and an optical pick-up being capable of moving in the radial direction of a disk driven by the motor for reading recorded data.

2. Description of Background Art

In conventional data recording disks, e.g., CD-ROM, CD-I, data are recorded in the manner of CLV (Constant Linear Velocity). Therefore, in conventional disk players, a motor is feed back controlled so as to coincide frequency and phase of bit signals of output-data elements, which are read from a disk driven by a motor, with frequency and phase of master clock signals, which have fixed frequency for sampling the output-data elements. The rotational speed of the disk must be changed on the basis of positions of an optical pick-up so as to fix linear speed between the disk and the optical pick-up. Namely, with the movement of the optical pick-up from an edge to a center of the disk, the rotational speed of the disk must be gradually accelerated.

However, above described conventional disk player has the following disadvantages.

In the conventional disk player, the motor speed is feed back controlled with the movement of the optical pick-up. And the output-data elements are sampled after the motor speed reaches an object speed. Generally, it takes a longer time to provide a feed back control to mechanical systems, e.g., motors. Thus, it also takes a longer time to read the output-data elements from a disk.

In addition, the motor speed is always changed by controlling current density with the movement of the optical pick-up. Thus, the motor is accelerated and braked many times, so that electric power consumption is increased and durability of the motor is decreased.

SUMMARY OF THE INVENTION

An object of the invention is to provide a disk player, which is capable of accessing to a disk in a short time, having higher durability and lower electric power consumption.

To achieve the object, the disk player of the present invention comprises:
- a motor for rotating a disk;
- an optical pick-up for reading recorded data, which include synchronizing signals and output-data elements and which are recorded on said disk, and outputting them as first signals, said optical pick-up being capable of moving in the radial direction of a disk driven by said motor;
- a first clock section for extracting the synchronizing signals from the first signals and generating first clock signals, whose frequency is equal to the frequency of the synchronizing signals;
- a second clock section for generating second clock signals and coinciding the frequency and the phase of the second clock signals with the frequency and the phase of the first clock signals;
- said second clock section being a phase lock circuit including a voltage controlled oscillator for outputting the second clock signals, a phase comparing section for comparing the phase of the second clock signals with the phase of the first clock signals, said phase comparing section outputting phase difference signals whose voltage level corresponds to the phase difference between the first clock signals and the second clock signals, and a control signal generating section for generating control voltage, which is capable of making the phase difference zero, on the basis of voltage level of the phase difference signals and voltage level corresponding to predetermined initial frequency of said voltage controlled oscillator and inputting the control voltage to said voltage controlled oscillator;
- a data extracting section for extracting the output-data elements in the first signals on the basis of the second clock signals and outputting them as second signals; and
- a processing section for rotating said motor at a fixed rotational speed.

In the disk player of the present invention, the motor speed is fixed during the optical pick-up reading of the recorded data, so that the output-data elements can be read immediately after the optical pick-up moves, and access time can be shortened.

Since the motor speed is fixed, current density of the motor is not necessary to change, so that electric power consumption is decreased and durability of the motor can be increased.

BRIEF DESCRIPTION OF THE DRAWINGS

An embodiment of the present invention will now be described by way of an example and with reference to the accompanying drawings, in which.

DETAILED DESCRIPTION OF A PREFERRED EMBODIMENT

A preferred embodiment of the present invention will now be described in detail with reference to the accompanying drawings.

Figure 1:
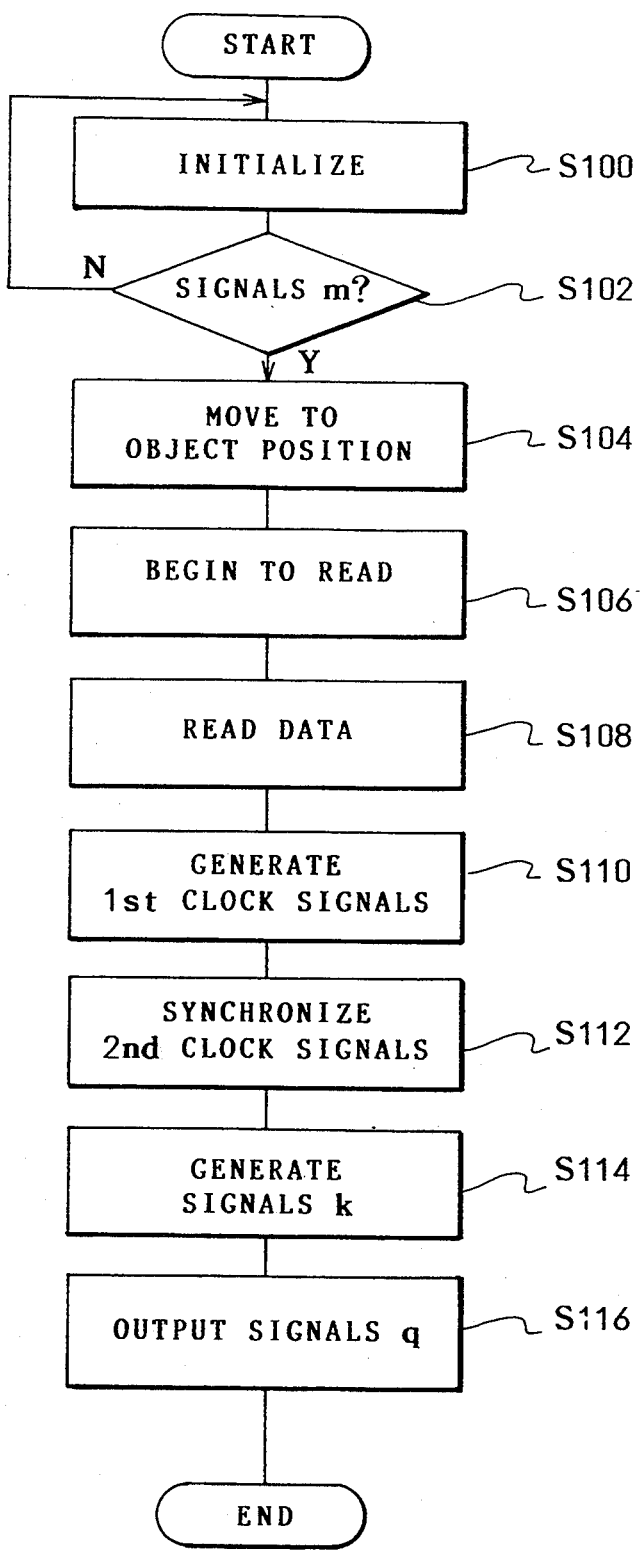
FIG. 1 is a flow chart showing the action of the disk player.
Figure 2:
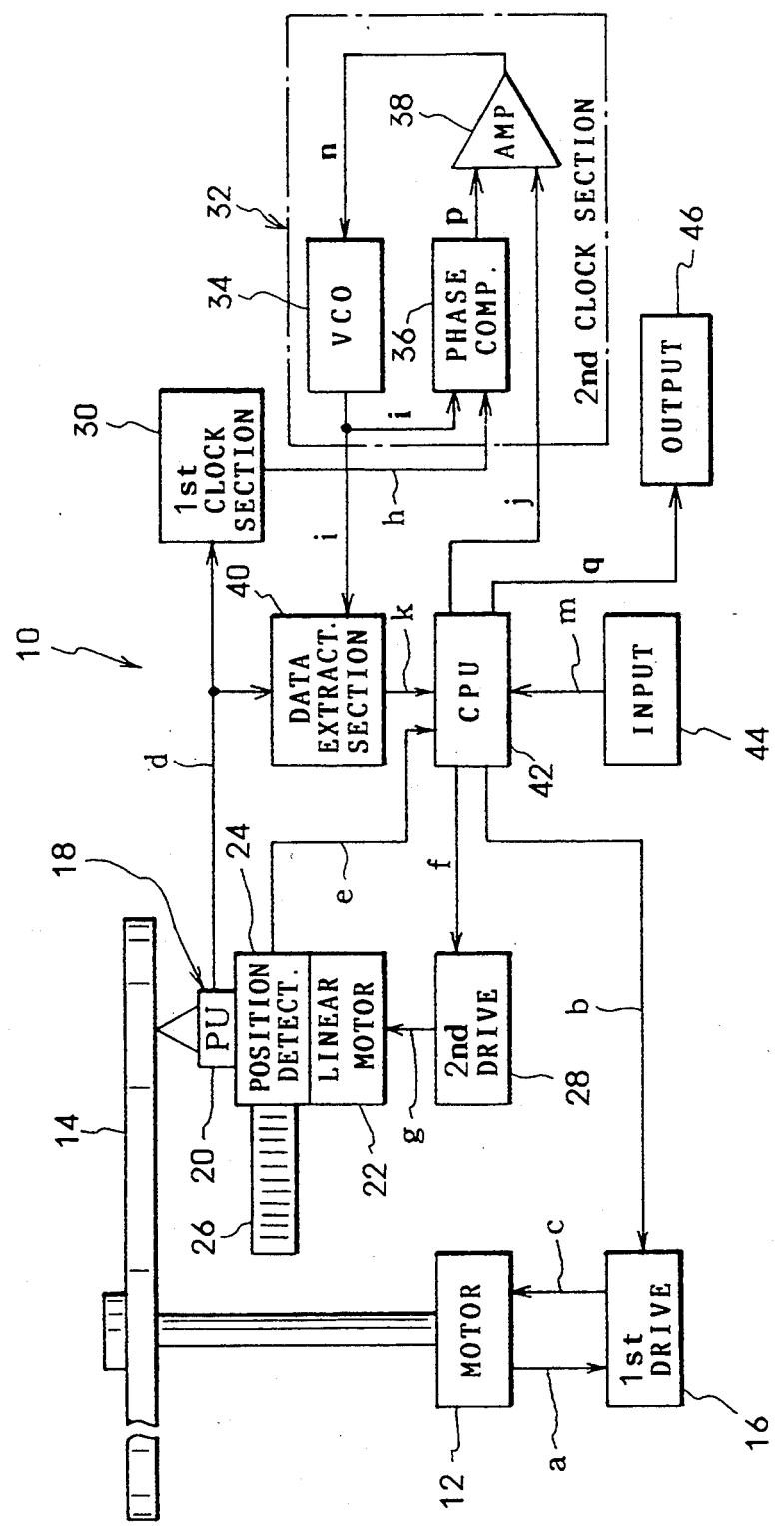
FIG. 2 is a block diagram of a disk player of an embodiment of the present invention.

FIG. 2 is a block diagram of a disk player of the present embodiment, which is capable of outputting information expressed by letters. FIG. 1 is a flow chart showing the action of the disk player.

Firstly, the constitution of the disk player 10 will be explained with reference to FIG. 2.

A spindle motor 12 rotates a disk 14, which is mounted on a turn table (not shown). The spindle motor 12 has a frequency generator (not shown), which generates frequency signals (a) corresponding to the present rotational speed of the motor 12.

A first drive section 16 controls the rotational speed of the motor 12. The first drive section 16 receives first control signals (b), and sends first drive signals (c) to the motor 12. The first drive section 16 adjusts the voltage level of the first drive signals (c) on the basis of the frequency signals (a) from the motor 12 so as to maintain the rotational speed of the motor 12.

An optical pick-up 18 has a pick-up unit 20, a linear motor 22 and a position detecting section 24.

The pick-up unit 20 reads recorded data from the disk 14, and outputs first signals (d) including synchronizing signals and output-data elements, which will be outputted as lettered information. The output-data elements are recorded on the disk 14 with bit frequency, which is equal to the frequency of the synchronizing signals.

The linear motor 22 linearly moves the pick-up unit 20 in the radial direction of the disk 14 for reading the recorded data.

The position detecting section 24 detects the radial position of the pick-up unit 20 with respect to the disk 14. Note that, the position detecting section 24 is capable of detecting the radial position of the pick-up unit 20 by reading scale marks of a linear scale 26. The position detecting section 24 outputs position signals (e), which indicate the radial position of the pick-up unit 20 with respect to the disk 14.

A second drive section 28 drives the linear motor 22. The second drive section 28 receives second control signals (f), and outputs second drive signals (g) for driving the linear motor 22.

A first clock section 30 extracts the synchronizing signals in the first signals (d), and generates first clock signals (h), whose frequency is equal to that of the synchronizing signals.

A second clock section 32 is a phase lock loop (PLL) circuit including a voltage controlled oscillator (VCO) 34, a phase comparing section 36 and a differential amplifier 38. The second clock section 32 generates second clock signals (i), and coincides the frequency and the phase of the second clock signals (i) with the frequency and the phase of the first clock signals (h).

The oscillating frequency of the VCO 32 is controlled by voltage control signals (n), which is sent from the differential amplifier 38. Output signals of the VCO 32 are so-called master clock signals or the second clock signals (i).

The phase comparing section 36 compares the phase of the first clock signals (h) with the phase of the second clock signals (i), and outputs phase difference signals (p).

The differential amplifier 38, which is an example of a control signal generating section, generates the voltage control signals (n), which is capable of making the phase difference between the first clock signals (h) and the second clock signals (i) zero, on the basis of the voltage level of the phase difference signals (p) and voltage level of the free-run control signals (j), which is predetermined as a voltage level corresponding to a predetermined initial frequency (free-run frequency) of the VCO 32. And the differential amplifier 38 sends the voltage control signals (n) to the VCO 34.

A data extracting section 40 samples and extracts the output-data elements in the first signals (d) on the basis of the second clock signals (i), and outputs them as second signals (k).

A central processing unit (CPU) 42 has a function of a processing section. The CPU 42 sends the first control signals (b) to the first drive section 16. The first control signals (b) correspond to input signals (m), which are inputted by an input section 44, e.g., switches. The CPU 42 also sends the second control signals (f) to the second drive section 28, and sends the free-run control signals (j), which correspond to the position signals (e), to the differential amplifier 38. The CPU 42 processes the second signals (k), and sends them, as letter output signals (q), to an output section 46, e.g., a display unit. Note that, control programs for controlling the CPU 42 are previously stored in a ROM (not shown).

Next, the action of the disk player 10 will be explained with reference to FIGS. 1 and 2.

Firstly, the disk player 10 is turned on. The CPU 42 outputs the first control signals (b) so as to drive the motor 12 by the first drive section 16. And the CPU 42 sends the free-run control signals (j), which correspond to the position signals (e) from the position detecting section 24, to the differential amplifier 38 (STEP 100). Then the CPU 42 stands by until the input signals (m) are inputted from the input section 44 (STEP 102). Note that, since the free-run control signals (j) are inputted to the differential amplifier 38, the second clock section 32 outputs initial second clock signals (i), whose frequency corresponds to the free-run control signals (j).

When an initial reading position (an object position) of the optical pick-up 18, as the input signals (m), is inputted by the input section 44, the CPU 42 sends the second control signals (f) to the second drive section 28 so as to drive the linear motor 22 and move the optical pick-up 18 to the object position. Upon coinciding the position signals (e) with the object position, the CPU 42 stops the second control signals (f) so as to stop the movement of the optical pick-up (STEP 104).

Upon reaching the object position, the CPU 42 starts to read the recorded data on the disk 14 by the optical pick-up 18 (STEP 106). The optical pick-up 18 reads the recorded data from the disk 14 and outputs them as the first signals (d) (STEP 108).

The first clock section 30 extracts the synchronizing signals in the first signals (d) and generates the first clock signals (h), whose frequency is equal to that of the synchronizing signals (STEP 110).

The second clock section 32 compares the second clock signals (i) with the first clock signals (h), and controls the second signals (i) to coincide the frequency and the phase of the second clock signals (i) with the frequency and the phase of the first clock signals (h) (STEP 112).

The data extracting section 40 synchronizes with the second clock signals (i), whose frequency and phase have been equal to that of the first clock signals (h), and extracts the output-data elements in the first signals (d) so as to send the second signals (k) to the CPU 42 (STEP 116).

Above described STEPs 106–116 will be repeated to continuously read the recorded data and output the lettered information from the output section 46.

The bit frequency of the synchronizing signals in the first signals (d), which are generated by the optical pick-up 18, and the output-data elements are changed according to the movement, in the radial direction of the disk 14, of the optical pick-up 18, but the second clock signals (i) for sampling the output-data elements are always controlled to coincide the frequency and the phase with that of the synchronizing signals by the second clock section 32, so that the output-data elements can be certainly extracted as the second signals (k) by the data extracting section 40.

In the present invention, the rotational speed of the disk 14 is fixed, so the rotational speed of the motor 12 can be fixed at a high speed. Therefore, the access time can be further shortened.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk player, comprising:
   a motor for rotating a disk;
   an optical pick-up for reading recorded data including synchronizing signals and output-data elements recorded on said disk, and outputting them as first signals, said optical pick-up being capable of moving in the radial direction of a disk driven by said motor;
   a first clock section for extracting the synchronizing signals from the first signals and generating first clock signals, whose frequency is equal to the frequency of the synchronizing signals;
   a second clock section for generating second clock signals and coinciding the frequency and the phase of the second clock signals with the frequency and the phase of the first clock signals;
   said second clock section being a phase lock circuit including a voltage controlled oscillator for outputting the second clock signals, a phase comparing section for comparing the phase of the second clock signals with the phase of the first clock signals, said phase comparing section outputting phase difference signals whose voltage level corresponds to the phase difference between the first clock signals and the second clock signals, and a control signal generating section for generating control voltage, which is capable of making the phase difference zero, on the basis of voltage level of the phase difference signals and voltage level corresponding to predetermined initial frequency of said voltage controlled oscillator and inputting the control voltage to said voltage controlled oscillator;
   a data extracting section for extracting the output-data elements in the first signals on the basis of the second clock signals and outputting them as second signals; and
   a processing section for rotating said motor at a fixed rotational speed.

2. The disk player according to claim 1, wherein said control signal generating section is a differential amplifier.

3. The disk player according to claim 1, wherein said motor for rotating said disk is a spindle motor.

4. The disk player according to claim 3, and further including a frequency generator operatively connected to said spindle motor for generating frequency signals corresponding to the rotational speed of the spindle motor.

5. The disk player according to claim 1, and further including a first drive section for receiving signals from said processing section for controlling the rotational speed of the motor.

6. The disk player according to claim 1, and further including a linear motor operatively connected to said optical pick-up for imparting a radial movement to said optical pick-up.

7. The disk player according to claim 6, and further including a second drive section for receiving second control signals and outputting second drive signals for driving the linear motor.

8. The disk player according to claim 7, wherein said processing section generates said second control signals for controlling the linear motor.

* * * * *